Nov. 19, 1963  T. S. GORTON, JR  3,111,102
APPARATUS FOR DUMPING DEBRIS FROM THE DECK OF A VESSEL
Original Filed June 17, 1957  2 Sheets-Sheet 2

INVENTOR.
Thomas S. Gorton Jr.
BY Robert R. Churchill
ATTORNEY

United States Patent Office 3,111,102
Patented Nov. 19, 1963

3,111,102
APPARATUS FOR DUMPING DEBRIS FROM THE DECK OF A VESSEL
Thomas S. Gorton, Jr., Cambridge, Mass., assignor to Riverside Inc., Boston, Mass., a corporation of Massachusetts
Continuation of application Ser. No. 666,164, June 17, 1957. This application Apr. 25, 1962, Ser. No. 193,038
8 Claims. (Cl. 114—32)

This invention relates to apparatus for automatically discharging debris from the deck of a fishing vessel.

The invention has for a principal object to provide novel and improved apparatus for automatically discharging debris into the sea from the deck of a fishing vessel, particularly a scallop dragger, which is characterized by structure which enables the speed and efficiency of the dragging operations to be substantially increased.

A further object of the invention is to provide novel and improved apparatus for discharging debris from the deck of a fishing vessel which is simple in construction, may be economically manufactured and which is particularly adapted for use in a scallop dragger wherein shells and rocks and other foreign matter are deposited on the deck of the dragger together with merchantable scallops, and wherein the shells, rocks and other foreign matter may be rapidly and efficiently discharged over the side of the vessel after the usable scallops are removed therefrom.

With these general objects in view and such others as may hereinafter appear, the present invention consists in the novel and improved apparatus for discharging debris from the deck of a fishing vessel hereinafter described and particularly defined in the claims at the end of this specification.

In general the present invention contemplates novel and improved apparatus for use in a fishing vessel and particularly for use in a scallop dragger wherein a substantial amount of debris and other foreign matter together with scallops is dumped from the drag onto the deck of the dragger. After the usable scallops are picked out from the mass and the drag is reset the debris must be discharged into the sea, and the deck must usually be cleaned before the drag may be raised and hauled back again and the contents discharged on the deck the next time. The present invention comprises an auxiliary deck member which may be pivotally mounted on top of the main deck adjacent one side of the dragger and upon which the contents of the drag collected during the dragging operation may be landed and dumped. A suitable port may be provided in the side of the vessel through which the debris may be discharged or dumped into the sea. The port is provided with a pivotally mounted cover member which is adapted to be normally closed during the dragging operation. Provision is made for automatically raising the auxiliary deck member to dispose its upper surface in an inclined position at substantially a 45° angle with relation to the main deck of the dragger and for simultaneously opening the cover member to enable the debris to automatically discharge through the port into the sea.

During the fishing operation scallops together with other foreign matter, such as shells, rocks and sand, are recovered from the bed of the ocean by the dragging operation and dumped on the deck of the dragger. After the usable scallops are picked from the mass of debris dumped on the deck of the dragger the remaining debris, usually a sizable amount, must be removed from the deck before the drag can be again hoisted from the bed of the ocean and its contents emptied on the deck. Prior to the present invention the debris which remained after the usable scallops were recovered from the mass was manually shoveled over the side of the dragger or through scuppers into the sea. It is apparent that this operation requires a large amount of back-breaking labor and is also a time-consuming operation. The present invention substantially eliminates the manual labor involved in shoveling and clearing the deck after the contents of the drag are dumped each time the drag is hauled back from the sea. As a result, the efficiency of the men is increased and enables them to spend more time at the boxes opening the scallops caught by the preceding dragging operation.

Figure 3:
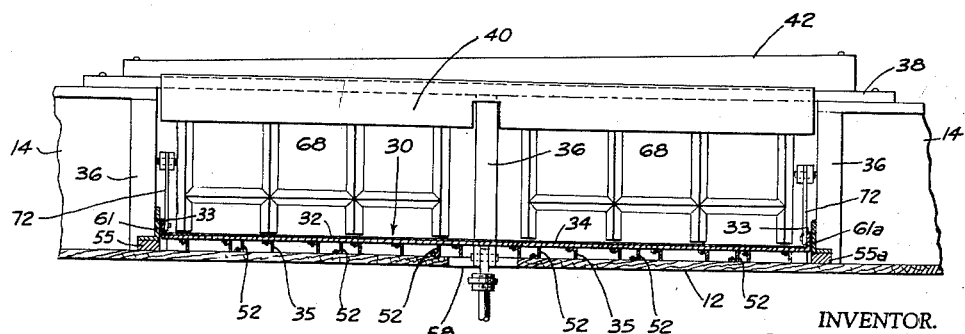
FIG. 3 is a vertical cross section taken on the line 3—3 of FIG. 1.

Referring now to the drawings, 10 represents a fishing vessel, preferably a scallop dragger of the type now in commercial use in the fishing industry, having a main deck 12 and an enclosing side rail or bulwark 14 as shown. In accordance with the present invention the novel dumping apparatus preferably comprises a pair of substantially identical auxiliary pivotally mounted deck units, one on each side of the vessel, as indicated generally at 30, each unit being pivotally secured to the main deck at its outer edge adjacent the side of the vessel. While it is preferred to provide the dragger 10 with a plurality of auxiliary deck units, for the purposes of the present description reference will be made to only one unit. Each auxiliary deck unit 30 comprises a substantially rectangular flat metal plate 32 having substantial thickness and rigidity, the end being preferably tapered inwardly, as shown, the inside edge and the two ends fore and aft being provided with upstanding walls 33, as shown, to confine the contents of the drag within the auxiliary deck, the outer edge of the auxiliary deck adjacent the side of the vessel being open. In practice the plate may be fabricated from ⅜″ steel plate surface with ¼″ thick boiler plate having a raised diamond shaped pattern on the surface 34 to enable fishermen to walk safely upon the plate during the fishing operation and is provided with longitudinally and transversely extended reinforcing angles 35 as shown. As best shown in FIG. 3, the side rail or bulwark 14 may be of the usual type which comprises a plurality of spaced, upwardly extended stanchions 36 secured to the frames (not shown) of the dragger. Suitable planking is secured to the outer edges of the stanchions to form a closed rail or bulwark around the deck of the dragger.

As illustrated in FIG. 3, an elongated opening is formed in the bulwark, preferably approximately midway between the bow and stern of the dragger, of a length slightly greater than the length of the auxiliary deck. The opening may be of any desired height. In practice the ends of the opening are defined by stanchions 36, and a single stanchion is positioned substantially midway between the ends to form a suitable support. A steel cross member 38 defining the top of the opening is secured to the top of the stanchions 36, and an angular metal rail 40 is secured to the top of the member 38 with one portion of the rail bent inwardly and downwardly to provide a protective surface for the member 38. A suitable heavy cap or buffer rail 42 is secured on top of the metal rail 40, as shown, to take the brunt of the wear during hauling of the drag over the top of the rail onto the auxiliary deck and to form a support upon which the drag may be balanced prior to setting it out. A suitable reinforcing beam 46 is secured to the lower portions of the stanchions 36 and to the deck 12. The outer edge of the auxiliary deck member 30 is preferably connected to the main deck 12 by hinges 48 as shown. In order to provide drainage sluiceways between the underside of the auxiliary deck 30 and the main deck 12 a plurality of spaced angle beams 52 are secured to the upper surface of the main deck, such angle beams also providing a support for the auxiliary deck member when in its lowered position.

In order to provide an enclosed well into which the auxiliary deck may be lowered, members 55, 55a are secured to the main deck adjacent to and spaced closely to the ends of the auxiliary deck. The members extend from the bulwark 14 inwardly and are snugly fitted against a longitudinally extended member 59 also secured to the main deck adjacent to and spaced from the inner edge of the auxiliary deck. Heavy steel angle members 61, 61a are bolted on top of the members 55, 55a and extend upwardly a short distance above the upstanding walls 33 of the auxiliary deck. As shown, a substantially triangularly shaped member 65 is secured upon the top surface of the longitudinally extended member 59. In this manner a shallow well is formed into which the auxiliary deck may be lowered which serves to prevent debris from falling into the area under the auxiliary deck and between the spaced angle beams 52 causing the deck to be sprung or damaged when it is lowered in position to receive the drag.

In order to raise the auxiliary deck unit 30 to an inclined position substantially 45° with relation to the main deck 12 a hydraulic cylinder 54 having a piston 56 is provided. The cylinder 54 may be pivotally mounted at a medial portion thereof as indicated at 57, the outer end of the piston being secured to the underside of the auxiliary deck by a pin and bearing connection 62. The hydraulic cylinder may be connected by a flexible hose connection 64 to a source of hydraulic power of any preferred type provided in the engine room (not shown) of the dragger. Suitable controls of the type which may be purchased on the market are provided for operating the hydraulic cylinder to raise the auxiliary deck from a horizontal to an inclined position. The controls may be positioned in the pilot house 66 to enable the captain or mate on watch to raise and lower the auxiliary deck unit whenever it is necessary to discharge the debris collected upon the surface of the plate 32 into the sea.

Figure 1:
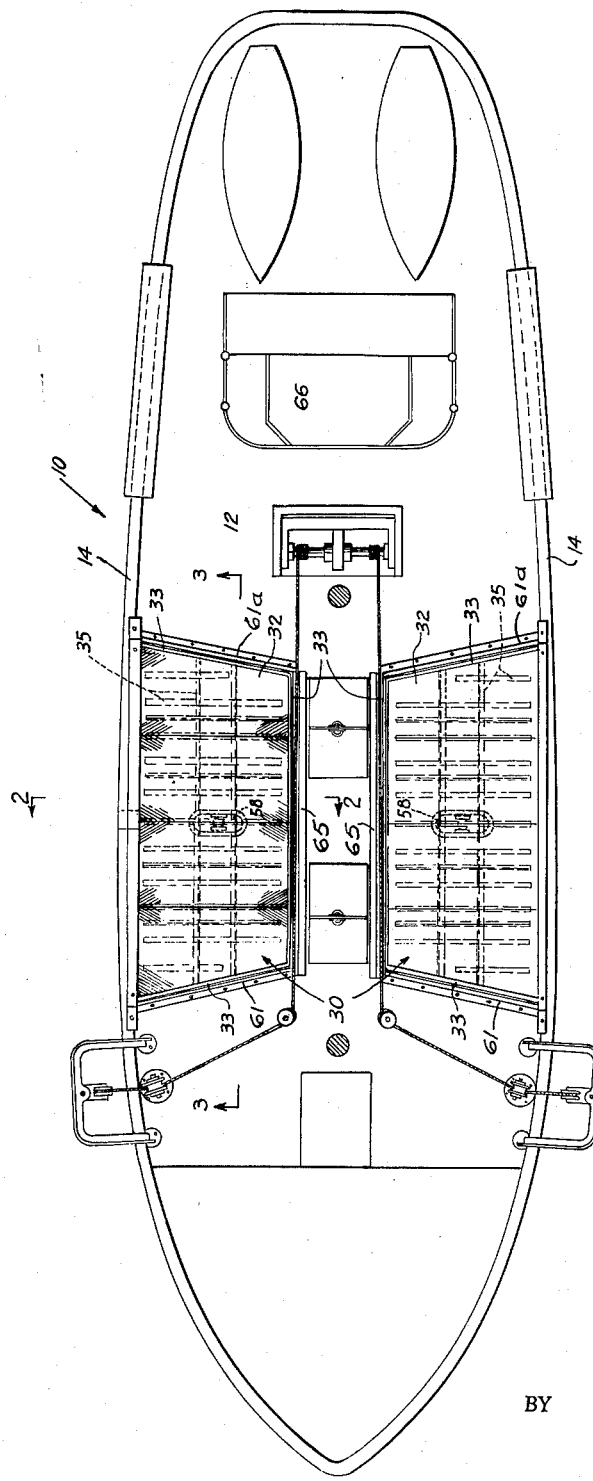
FIG. 1 is a plan view of a scallop dragger embodying the present apparatus.
Figure 2:
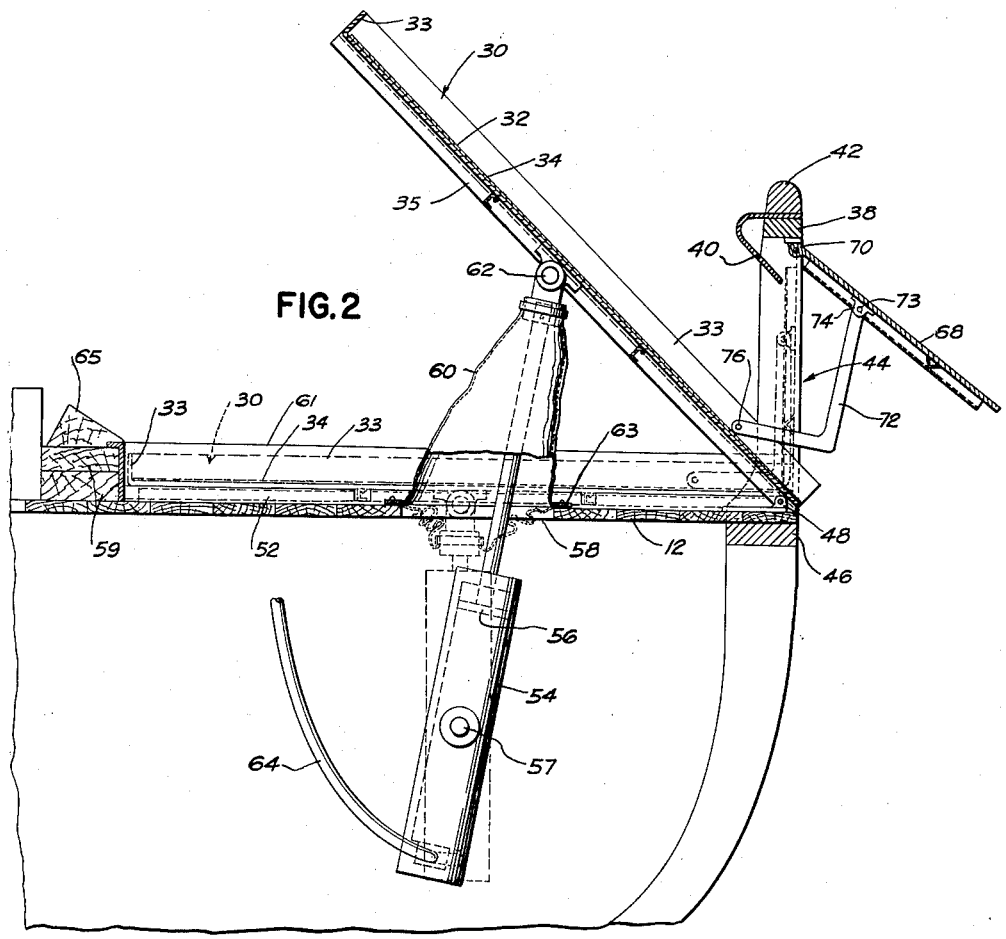
FIG. 2 is a vertical cross section taken on the line 2—2 of FIG. 1.

As indicated in FIG. 2, the piston 56 connected substantially centrally of the auxiliary deck member 30 to the underside thereof is arranged to extend through an oval shaped opening 58 in the main deck 12, and in order to prevent water and sand or other debris from entering the opening 58 a flexible neoprene boot 60 is connected at its upper end to the piston by a suitable strap or clamp at a point immediately below the pivotal connection 62, and at its lower end to the edges of the deck defined by the oval opening 58, the lower end of the boot being secured to the deck by a suitable collar 63 as shown. In operation the flexible neoprene boot is capable of extension and contraction to follow the movement of the piston while maintaining the deck opening closed to water and debris.

In order to cover the side rail opening or freeing port 44 when the auxiliary deck unit 30 is in a lowered position to prevent too great a volume of sea water from flooding the deck 12 of the dragger, a normally closed cover member 68 of a size sufficient to close the freeing port 44 is preferably hingedly connected to the underside of the cross member 38 by hinges 70 as shown. Provision is made for automatically opening and closing the cover member 68 simultaneously with the raising and lowering of the auxiliary deck unit 30 to enable the debris collected on the plate 32 to be discharged through the freeing port 44 into the sea. As herein shown, angular links 72 may be pivotally connected at one end to the cover member 68 by suitable pins 73 extended through flange members 74 secured to the underside of the cover member. The opposed ends of the link members 72 may be pivotally connected to the side walls 33 of the auxiliary deck 30 by pins 76 fitted in holes provided in the side walls. In this manner it will be observed that when the auxiliary deck unit 30 is raised upwardly the cover member 68 will be preferably simultaneously pushed outwardly and upwardly on its hinges through the linkage 72 to open the port and enable the debris to pass through the freeing port 44 into the sea.

In operation the drag member (not shown) which may be of the type commonly used in the fishing industry and which comprises a heavy steel framework and heavy bulky chain bag is hoisted by any usual or preferred means over the side of the vessel and the drag lowered into the ocean. The heavy drag is dragged along the bed of the ocean, and scallops together with foreign matter, such as rocks, shells and sand, are swept into the chain bag. Whenever the dragger is fishing in areas having a rocky bottom, sizable rocks are usually collected in the chain bag together with scallops. The usual dragging time is from twenty minutes to one hour, according to fishing conditions, and at the end of the dragging or towing period the drag is hoisted aboard the vessel and the contents of the drag emptied onto the plate 32 of the auxiliary deck unit 30. As soon as the drag has been emptied it is again set over the side of the vessel and the dragging operation is continued. In practice the fishermen working on the deck of the vessel must recover the usuable scallops from the mass of debris and place the scallops in wire baskets which are then carried to the after portion of the vessel. The scallops are dumped into scallop boxes, then opened and the shells discharged over the side of the vessel. These operations must be accomplished within the dragging time of from twenty minutes to one hour in order to enable the drag to be again hoisted and its contents dumped onto the deck of the vessel and the above operation repeated. The present invention enables the fishing operation to be smoothly and efficiently carried out and reduces the time required in recovering the usable scallops from the debris and cleaning the deck of the vessel for the next catch. After the usable scallops have been recovered from the catch emptied onto the plate 32 of the auxiliary deck unit the captain or mate on watch may then operate the controls to the hydraulic cylinder which cause the piston to be extended, the auxiliary deck plate raised, the cover opened simultaneously therewith, and the rocks and unusable debris caused to slide from the surface of the plate 32 through the freeing port 44 into the sea. In practice an amount of sand and other smaller debris, such as shells or stones, may collect within the sluiceways between the spaced beams 52. The sluiceways may be hosed clean rapidly and the matter contained therein discharged through the sluiceways into the sea. The captain or mate may then actuate the hydraulic controls to lower the auxiliary deck plate 32 and close the cover member 68. The deck of the vessel is, therefore, rapidly and efficiently made ready for the next catch to be dumped from the drag onto the deck.

It will be apparent from the foregoing description that the present apparatus for discharging the debris deposited upon the deck of the scallop dragger after the usable scallops have been removed therefrom, efficiently and automatically discharges the debris over the side of the vessel, and in this manner the fishing time is substantially reduced. Prior to the present invention the drag could often not be hoisted aboard and its contents emptied onto the deck of the vessel for a substantially long period of time after it had previously been hoisted from the bed of the ocean, thus delaying the fishing operation and cutting down the number of times that the drag could be hoisted aboard the vessel in any given time.

While the preferred embodiment of the invention has been herein illustrated and described, it will be understood that the present invention may be embodied in other forms within the scope of the claims at the end of this specification.

This application is a continuation of my pending application Serial No. 666,164, filed June 17, 1957, now abandoned.

Having thus described the invention, what is claimed is:

1. In a dragger having a main deck and an enclosing bulwark extending above the main deck, an auxiliary deck member pivotally mounted on the main deck and having a fulcrum adjacent to and spaced inwardly from the side of the dragger and upon which the contents of the drag including debris are deposited, said deck member including a flat plate provided with end walls and an inner side wall forming a pan adapted to confine the contents of the drag when dumped thereon, said bulwark having an opening therein adjacent the outer pivoted side of the auxiliary deck member, a cover member pivotally mounted at its upper end in said bulwark for closing said bulwark opening when the deck member is in its lowered position, means connected to the auxiliary deck member for elevating it, and linkage comprising a pair of links each connected between the auxiliary deck member and cooperating with the cover member to effect simultaneous opening of the cover member upon elevation of the auxiliary deck to permit dumping of the debris through the bulwark opening into the sea, each of said links having arms positioned parallel to the surface of the auxiliary deck and parallel to the surface of the bulwark respectively to provide an uninterrupted working surface on the auxiliary deck when the deck is in a lowered position.

2. An auxiliary deck member as defined in claim 1 wherein means are provided on the main deck of the dragger for protecting the upstanding side and end walls of the auxiliary deck from damage by the drag and its contents dropped on the deck, and a buffer rail secured to said bulwark across the top of said opening to protect the cover member.

3. An auxiliary deck member as defined in claim 2 wherein the means for protecting the auxiliary deck from damage by the drag comprises a relatively shallow well open on the bulwark side defined by upstanding side and walls secured to the main deck and into which the auxiliary deck is lowered, the walls of the well extending slightly above the walls of the auxiliary deck member.

4. In a dragger having a main deck and an enclosing bulwark upstanding from the main deck, an auxiliary deck member comprising a steel plate reinforced on its underside pivotally mounted on the main deck and having a fulcrum adjacent the side of the dragger and upon which the contents of the drag including debris are deposited, spacing means comprising a plurality of spaced elongated parallel angle bars secured to and extended transversely of the main deck and disposed under the auxiliary deck to provide drainage sluiceways open at both ends and also arranged to normally support the auxiliary deck above the upper surface of the main deck, said bulwark having an opening therein adjacent the outer edge of the auxiliary deck member, a cover member adapted to normally close the opening to prevent the sea from flooding the deck of the dragger, means for elevating the auxiliary deck member to an inclined position relative to the side of the dragger, and means connected between the auxiliary deck and the cover for opening the cover member when the auxiliary deck is elevated to permit dumping of the debris through the bulwark opening into the sea, said cover member closing the open ends of the drainage sluiceways adjacent the bulwark when the auxiliary deck is in its closed position.

5. An auxiliary deck member as defined in claim 4 wherein the means for opening the cover includes linkage provided with arms shaped to conform to the contour of and lie parallel with the auxiliary deck and bulwark respectively when the auxiliary deck is in its lowered position to provide a clear uninterrupted working and walking surface on the deck.

6. The method of fishing for sea scallops from a scallop dragger having an auxiliary deck which consists of the steps of dragging the floor of the ocean for a predetermined length of time, hauling the drag up from the floor of the ocean and dumping its contents including merchantable scallops and debris onto the auxiliary deck of the dragger, resetting the drag, picking up the merchantable scallops, automatically elevating the auxiliary deck to clear the deck, lowering the auxiliary deck, and opening the merchantable scallops.

7. In a method of fishing for sea scallops from a scallop dragger having an auxiliary deck pivotally mounted on the main deck, an upstanding bulwark provided with an opening therein, and a cover for the opening, which consists in dragging the ocean floor for a predetermined time, hoisting the drag and dumping its contents including scallops and debris on the auxiliary deck of the dragger, resetting the drag over the side of the dragger, removing useable scallops from the debris, automatically elevating the auxiliary deck while opening the bulwark cover to dump the debris into the sea through the bulwark opening and clear the deck, lowering the deck, opening the merchantable scallops within the length of time required for refilling the drag to thereby substantially increase the number of times the filled drag may be hauled back and dumped onto the deck of the dragger to increase the production in any given six-hour watch.

8. In a scalloper having a main deck and an enclosing bulwark upstanding from the main deck, an auxiliary deck member comprising a metal plate pivotally mounted on the main deck adjacent the side of the scalloper and upon which the contents of the drag including debris are deposited, spacing means under the auxiliary deck, said spacing means comprising upstanding supports providing a drainage space having an opening to the sea, said bulwark having an opening therein adjacent the outer edge of the auxiliary deck member, a cover member adapted to normally close the opening, means for elevating the auxiliary deck member to an inclined position relative to the side of the scalloper, and means connected to the cover for opening the cover to permit dumping of the debris through the opening into the sea, said cover member closing the opening in the bulwark when the auxiliary deck is in its lowered position.

References Cited in the file of this patent

UNITED STATES PATENTS

| | | |
|---|---|---|
| 664,834 | Cornelius | Jan. 1, 1901 |
| 2,691,355 | Baier | Oct. 12, 1954 |
| 2,938,487 | Franke | May 31, 1960 |